US012352624B2

United States Patent
Xu et al.

(10) Patent No.: US 12,352,624 B2
(45) Date of Patent: Jul. 8, 2025

(54) COAXIAL FOUR-REFLECTION OPTICAL SYSTEM FOR VISIBLE LIGHT LONG-WAVE INFRARED COMMON-APERTURE IMAGING

(71) Applicant: Changchun Institute of Optics, Fine Mechanics and Physics, Chinese Academy of Sciences, Changchun (CN)

(72) Inventors: Wei Xu, Changchun (CN); Qingya Li, Changchun (CN); Tiancong Wang, Changchun (CN); Yongjie Piao, Changchun (CN); Zongxuan Li, Changchun (CN); Defu Zhang, Changchun (CN)

(73) Assignee: Changchun Institute of Optics, Fine Mechanics and Physics, Chinese Academy of Sciences, Changchun (CN)

( * ) Notice: Subject to any disclaimer, the term of this patent is extended or adjusted under 35 U.S.C. 154(b) by 273 days.

(21) Appl. No.: 18/121,026

(22) Filed: Mar. 14, 2023

(65) Prior Publication Data
US 2023/0221181 A1 Jul. 13, 2023

Related U.S. Application Data

(63) Continuation of application No. PCT/CN2020/000286, filed on Nov. 20, 2020.

(51) Int. Cl.
*G01J 3/28* (2006.01)
*G01J 3/02* (2006.01)

(52) U.S. Cl.
CPC ............ *G01J 3/2823* (2013.01); *G01J 3/021* (2013.01); *G01J 2003/2826* (2013.01)

(58) Field of Classification Search
CPC .. G01J 2003/2826; G01J 3/021; G01J 3/2823; G01J 3/36; G02B 17/06; G02B 17/08
See application file for complete search history.

(56) References Cited

U.S. PATENT DOCUMENTS

2016/0370562 A1* 12/2016 Zhang ................ G02B 27/0025

FOREIGN PATENT DOCUMENTS

| CN | 101634744 Y | 1/2010 |
| CN | 107843980 A | 3/2018 |

(Continued)

OTHER PUBLICATIONS

ISR of PCT/CN2020/000286.

*Primary Examiner* — Tri T Ton
(74) *Attorney, Agent, or Firm* — Hemisphere Law, PLLC; Zhigang Ma (57) ABSTRACT

The present disclosure relates to a coaxial four-reflection optical system with visible light long-wave infrared common-aperture imaging, and belongs to the technical field of optical systems. The technical problems that the axial length compactness and the imaging quality of the visible light/ infrared composite imaging system in the existing technology need to be improved are solved. The optical system of the present disclosure includes a main reflecting mirror, a first transmitting mirror, a third reflecting mirror, a fourth reflecting mirror, a second transmitting mirror, a third transmitting mirror and a fourth transmitting mirror. The optical system has a visible light panchromatic imaging function, a visible light multispectral imaging function and a long-wave infrared imaging function, which lowers the requirement of a space remote sensor for ground illumination conditions, realizes all-time space optical remote sensing reconnaissance and dynamic monitoring, and greatly improves the functional density and cost performance of a space optical load. The optical system has a compact structure, low distortion and good stray light inhibition, and is convenient to process, assemble and adjust.

9 Claims, 5 Drawing Sheets

(56) References Cited

FOREIGN PATENT DOCUMENTS

| | | |
|---|---|---|
| CN | 209311779 A | 8/2019 |
| CN | 111487756 A | 8/2020 |
| CN | 111812829 Y | 10/2020 |
| DE | 102016217737 A | 11/2016 |

* cited by examiner

COAXIAL FOUR-REFLECTION OPTICAL SYSTEM FOR VISIBLE LIGHT LONG-WAVE INFRARED COMMON-APERTURE IMAGING

TECHNICAL FIELD

The present disclosure belongs to the technical field of optical systems, specifically to a coaxial four-reflection optical system with visible light long-wave infrared common-aperture imaging.

BACKGROUND

With the rapid development of an aerospace technology, there is an increasing demand for high-resolution images. While the demand for high-resolution imaging is met, people put forwards increasingly high demands for composite imaging, structural compactness, and ease of machining and adjustment of an optical system, and put forwards a demand for visible light/infrared composite imaging. In an existing technology, a visible light/infrared composite imaging optical system is mainly based on coaxial two-reflection and three-reflection systems, and beam splitting is still realized using a light filter/color separation filter. For example, a Kompsat-3A sub-meter-level high-resolution optical remote sensing satellite independently developed by South Korea has a typical visible light high-resolution and medium/long-wave infrared common-aperture optical remote sensing camera as its primary load. The visible panchromatic ground resolution is 0.54 m; the visible multispectral resolution is 2.16 m; and the medium wave/long-wave infrared resolution is 5 m. The principle of infrared imaging is realized by completely sharing primary and secondary three or four mirrors and a light filter for beam splitting. However, the axial length compactness of an optical-mechanical structure of the two-reflection and three-reflection coaxial systems needs to be further improved. Due to the beam splitting manner using a light filter/color separation filter, an aberration is introduced in a convergent imaging light path. Furthermore, the color separation filter will cause additional energy loss, which is not conducive to the imaging quality of the system.

SUMMARY

In order to solve the technical problem that the axial length compactness and the imaging quality of a visible light/infrared composite imaging system in an existing technology need to be improved, the present disclosure provides a coaxial four-reflection optical system with visible light long-wave infrared common-aperture imaging. The optical system has a visible light panchromatic imaging function, a visible light multispectral imaging function and a long-wave infrared imaging function, which lowers the requirement of a space remote sensor for ground illumination condition, realizes all-day spatial optical remote sensing reconnaissance and dynamic monitoring, and improves the functional density and cost performance of a spatial optical load. The optical system has a compact structure, low distortion, good stray light inhibition and convenience of machining and adjustment. In order to achieve the above objective, the present disclosure adopts the following technical solution:

The coaxial four-reflection optical system with visible light long-wave infrared common-aperture imaging includes a main reflecting mirror, a first transmitting mirror, a third reflecting mirror, a fourth reflecting mirror, a second transmitting mirror, a third transmitting mirror and a fourth transmitting mirror; the main reflecting mirror, the first transmitting mirror, the third reflecting mirror and the fourth reflecting mirror are coaxially disposed and are all two-order aspherical mirrors; the main reflecting mirror is used as an aperture diaphragm of the coaxial four-reflection optical system with visible light long-wave infrared common-aperture imaging; a surface of the first transmitting mirror is coated with a film to split entering light into a visible light spectral segment and an infrared spectral segment; the third reflecting mirror and the main reflecting mirror are integrated, and light passing holes are formed in both the third reflecting mirror and the fourth reflecting mirror; the second transmitting mirror, the third transmitting mirror and the fourth transmitting mirror are all high-order aspherical transmitting mirrors; and the first transmitting mirror, the fourth reflecting mirror, the second transmitting mirror, the third transmitting mirror and the fourth transmitting mirror are located on the same side of the main reflecting mirror.

The entering light is split into the visible light spectral segment and the infrared spectral segment by the first transmitting mirror after being reflected by the main reflecting mirror. The visible light spectral segment reaches the third reflecting mirror through the light passing hole on the fourth reflecting mirror after being reflected by the first transmitting mirror. The third reflecting mirror then reflects the light to the fourth reflecting mirror. The reflected light is converged to a first detector located at a focal plane after passing through the light passing hole on the third reflecting mirror to form an image on the first detector. The infrared spectral segment partially reaches the second transmitting mirror after being transmitted by the first transmitting mirror. The transmitted light reaches the third reflecting mirror through the second transmitting mirror. The third transmitting mirror then transmits the light to the fourth transmitting mirror. The transmitted light is converged to a second detector located at the focal plane after being transmitted by the fourth transmitting mirror to form an image on the second detector.

Further, a radius of curvature of a vertex of a reflecting surface of the main reflecting mirror is 714.536 mm;

a radius of curvature of a vertex of an entering surface (i.e. a reflecting surface) of the first transmitting mirror is 386.402 mm, and a radius of curvature of a vertex of an exiting surface of the first transmitting mirror is 177.540 mm;

a radius of curvature of a vertex of a reflecting surface of the third reflecting mirror is 202.836 mm;

a radius of curvature of a vertex of a reflecting surface of the fourth reflecting mirror is 264.466 mm;

a radius of curvature of a vertex of an entering surface of the second transmitting mirror is 101.730 mm, and a radius of curvature of a vertex of an exiting surface of the second transmitting mirror is 125.377 mm;

a radius of curvature of a vertex of an entering surface of the third transmitting mirror is 58.311 mm, and a radius of curvature of a vertex of an exiting surface of the third transmitting mirror is 107.076 mm;

a radius of curvature of a vertex of an entering surface of the fourth transmitting mirror is 60.574 mm, and a radius of curvature of a vertex of an exiting surface of the fourth transmitting mirror is 37.226 mm.

Further, an aperture of the main reflecting mirror is 426 mm.

Further, a material of the first transmitting mirror is germ glass; the coating film is an infrared anti-reflection film; and the first transmitting mirror has a reflectivity of 98% and a transmittance of 95%.

Further, the visible light spectral segment of the coaxial four-reflection optical system with visible light long-wave infrared common-aperture imaging has a range of 450 nm to 850 nm, and the infrared spectral segment of the coaxial four-reflection optical system with visible light long-wave infrared common-aperture imaging has a range of 8000 nm to 12000 nm.

Further, a visible light system in the coaxial four-reflection optical system with visible light long-wave infrared common-aperture imaging has a focal length of 3500 mm, and an infrared system in the coaxial four-reflection optical system with visible light long-wave infrared common-aperture imaging has a focal length of 706 mm.

Further, the visible light system in the coaxial four-reflection optical system with visible light long-wave infrared common-aperture imaging has an F-number of 8.33, and the infrared system in the coaxial four-reflection optical system with visible light long-wave infrared common-aperture imaging has an F-number of 1.68.

Further, the visible light system in the coaxial four-reflection optical system with visible light long-wave infrared common-aperture imaging has a range of a total field of view of 1.6°, and the infrared system in the coaxial four-reflection optical system with visible light long-wave infrared common-aperture imaging has a range of a total field of view of 1.2°.

Further, the visible light system in the coaxial four-reflection optical system with visible light long-wave infrared common-aperture imaging has a transmittance greater than or equal to 0.8, and the infrared system in the coaxial four-reflection optical system with visible light long-wave infrared common-aperture imaging has a transmittance greater than or equal to 0.75.

Further, the visible light system in the coaxial four-reflection optical system with visible light long-wave infrared common-aperture imaging has distortion less than 0.75% and a veiling glare coefficient less than or equal to 3%, and the infrared system in the coaxial four-reflection optical system with visible light long-wave infrared common-aperture imaging has distortion less than 0.5%.

Further, a size of an outer envelope of the coaxial four-reflection optical system with visible light long-wave infrared common-aperture imaging has is Φ426×760 mm, and a size of an outer envelope of the visible light system in the coaxial four-reflection optical system with visible light long-wave infrared common-aperture imaging is Φ426×590 mm.

The principle of the present disclosure is below: The coaxial four-reflection optical system with visible light long-wave infrared common-aperture imaging provided by the present disclosure includes a main reflecting mirror, a first transmitting mirror, a third reflecting mirror, a fourth reflecting mirror, a second transmitting mirror, a third transmitting mirror and a fourth transmitting mirror. The main reflecting mirror, the first transmitting mirror, the third reflecting mirror and the fourth reflecting mirror are coaxially disposed, that is, a four-mirror coaxial structure is adopted, thus effectively compressing the axial length of the visible light system. The infrared system and the visible light system share the main reflecting mirror and the first transmitting mirror of the system. At the position of the first transmitting mirror, a lens coated with a film on the surface is used to realize beam splitting between the visible light system and the infrared system, so that the visible light spectral segment is reflected along the first transmitting mirror, with a reflectivity of 98%, and the infrared spectral segment is transmitted through the first transmitting mirror, with a transmittance of 95%. Thus, the optical system has a visible light panchromatic imaging function, a visible light multispectral imaging function and a long-wave infrared imaging function. The main reflecting mirror and the third reflecting mirror are integrated, which lowers the machining and adjustment difficulty. The main reflecting mirror, the first transmitting mirror, the third reflecting mirror and the fourth reflecting mirror are all two-order aspherical mirrors, which are convenient for correction of astigmatism and field curvature. The second transmitting mirror, the third transmitting mirror and the fourth transmitting mirror are all high-order aspherical transmitting mirrors, which are convenient for correction of astigmatism. Furthermore, in the present disclosure, the visible light system realizes high effective suppression of stray light of the system at a first image plane on the basis of the secondary imaging principle which ensures the imaging quality of the optical system.

Compared with the prior art, the present disclosure has the following beneficial effects.

The coaxial four-reflection optical system with visible light long-wave infrared common-aperture imaging provided by the present disclosure has a visible light panchromatic imaging function, a visible light multispectral imaging function and a long-wave infrared imaging function, which lowers the requirement of a space remote sensor for ground illumination condition, can realize all-time space optical remote sensing reconnaissance and dynamic monitoring, and greatly improves the functional density and cost performance of a space optical load. The optical system has a compact structure, low distortion and good stray light inhibition, and is convenient to process and adjust.

The coaxial four-reflection optical system with visible light long-wave infrared common-aperture imaging provided by the present disclosure can realize the following technical parameters: the visible light spectral segment has a range of 450 nm to 850 nm; the visible light system has a focal length of 3500 mm; the visible light system has an F-number of 8.33; the visible light system has a range of a total field of view of 1.6°; the visible light system has a transmittance greater than or equal to 0.8; and the visible light system has distortion less than 0.75% and a veiling glare coefficient less than or equal to 3%. The infrared spectral segment has a range of 8000 nm to 12000 nm; the infrared system has a focal length of 706 mm; the infrared system has an F-number of 1.68; the infrared system has a range of a total field of view of 1.2°; the infrared system has a transmittance greater than or equal to 0.75; and the infrared system has distortion less than 0.5%. A size of an outer envelope of the visible light system is Φ426×590 mm, and a size of a general outer envelope of the optical system is Φ426×760 mm.

BRIEF DESCRIPTION OF THE DRAWINGS

In order to more clearly explain the technical solution in the embodiments of the invention, the following will briefly introduce the drawings needed in the embodiments. It is obvious that the drawings in the following description are only some embodiments of the invention. For those skilled in the art, other drawings can also be obtained from these drawings without creative work.

In the drawings: 1: main reflecting mirror; 1-1: reflecting surface of the main reflecting mirror; 2: first transmitting mirror; 2-1: entering surface (reflecting surface) of the first transmitting mirror; 2-2: exiting surface of the first transmitting mirror; 3: third reflecting mirror; 3-1: reflecting surface of the third reflecting mirror; 4: fourth reflecting mirror; 4-1: reflecting surface of the fourth reflecting mirror; 5: second transmitting mirror; 5-1: entering surface of the second transmitting mirror; 5-2: exiting surface of the second transmitting mirror; 6: third transmitting mirror; 6-1: entering surface of the third transmitting mirror; 6-2: exiting surface of the third transmitting mirror; 7: fourth transmitting mirror; 7-1: entering surface of the fourth transmitting mirror; 7-2: exiting surface of the fourth transmitting mirror; 8: first detector; and 9: second detector.

DETAILED DESCRIPTION OF THE EMBODIMENTS

In order to further understand the present disclosure, preferred implementations of the present disclosure are described in combination with specific implementations below, but it should be understood that these descriptions only further illustrate the features and advantages of the present disclosure and are not intended to limit the present disclosure.

Figure 1:
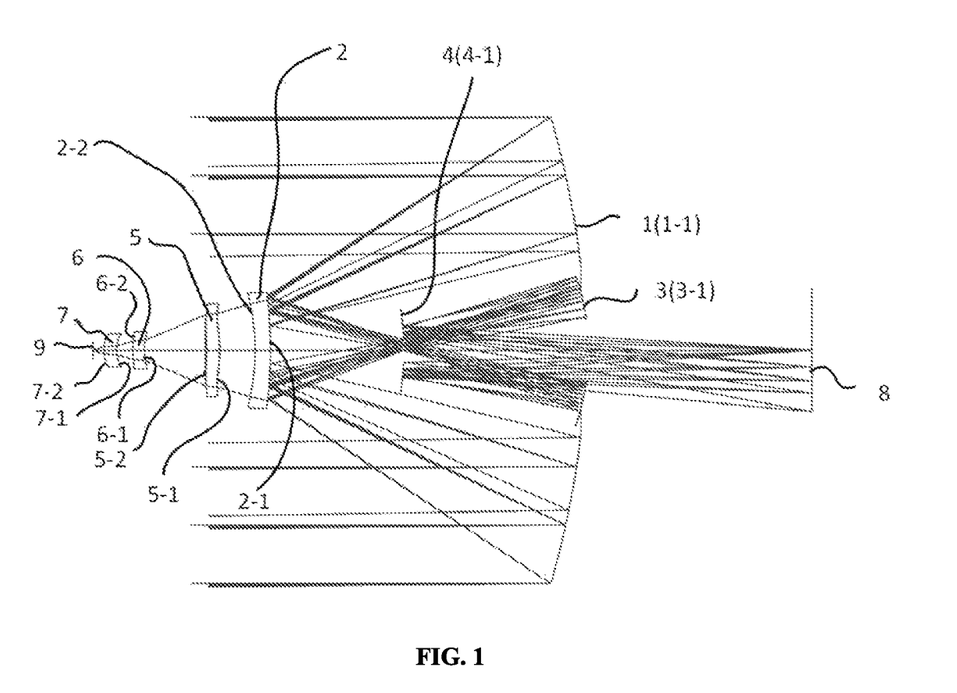
FIG. 1 is a schematic structural diagram of a coaxial four-reflection optical system with visible light long-wave infrared common-aperture imaging of the present disclosure.

As shown in FIG. 1, a coaxial four-reflection optical system with visible light long-wave infrared common-aperture imaging of the present disclosure includes a main reflecting mirror 1, a first transmitting mirror 2, a third reflecting mirror 3, a fourth reflecting mirror 4, a second transmitting mirror 5, a third transmitting mirror 6 and a fourth transmitting mirror 7. The first transmitting mirror 2, the fourth reflecting mirror 4, the second transmitting mirror 5, the third transmitting mirror 6 and the fourth transmitting mirror 7 are located on the same side of the main reflecting mirror 1. The main reflecting mirror 1, the first transmitting mirror 2, the third reflecting mirror 3 and the fourth reflecting mirror 4 are coaxial. The third reflecting mirror 3 and the main reflecting mirror 1 are integrated, thus avoiding adjustment of the third reflecting mirror 3 in the optical system.

The main reflecting mirror 1, the first transmitting mirror 2, the third reflecting mirror 3 and the fourth reflecting mirror 4 form a visible light system. The visible light system is of a four-mirror coaxial optical structure. The main reflecting mirror 1 is an aperture diaphragm of the visible light system, and is also an entrance pupil of the optical system. The first transmitting mirror 2 is on a reflected light path of the main reflecting mirror 1. A surface of the first transmitting mirror 2 is coated with a film. A visible light spectral segment is reflected by the first transmitting mirror 2. A light passing hole is formed in the third reflecting mirror 3, which allows the light reflected by the fourth reflecting mirror 4 for the second time to be converged on a first detector 8 at a focal plane after passing through the light passing hole. The fourth reflecting mirror 4 is placed at a primary image plane. A light passing hole is formed in the fourth reflecting mirror 4, which allows the light reflected by the first transmitting mirror 2 to enter the third reflecting mirror 3 through the light passing hole. Entering light reaches the third reflecting mirror 3 through the light passing hole on the fourth reflecting mirror 4 after being reflected by the main reflecting mirror 1 and the first transmitting mirror 2. The third reflecting mirror 3 then reflects the light to the fourth reflecting mirror 4. The light is converged, through the light passing hole of the third reflecting mirror 3, to the first detector 8 located at the focal plane after being reflected by the fourth reflecting mirror 4, so as to form an image on the first detector 8, thus finally realizing optical imaging. The main reflecting mirror 1, the first transmitting mirror 2, the third reflecting mirror 3 and the fourth reflecting mirror 4 are all two-order aspherical mirrors, such as two-order aspherical circular mirrors. The main reflecting mirror 1, the first transmitting mirror 2, the third reflecting mirror 3 and the fourth reflecting mirror 4 all use the two-order aspherical mirrors, which play a good role in suppressing the astigmatism and field curvature of the optical system.

The main reflecting mirror 1, the first transmitting mirror 2, the second transmitting mirror 5, the third transmitting mirror 6 and the fourth transmitting mirror 7 form an infrared system. The infrared system is of a catadioptric structure. The main reflecting mirror 1 is used as an entrance pupil of the optical system. The first transmitting mirror 2 is on a reflected light path of the main reflecting mirror 1. A surface of the first transmitting mirror 2 is coated with a film, and an infrared spectral segment passes through the first transmitting mirror 2. Entering light reaches the second transmitting mirror 5 after being reflected by the main reflecting mirror 1 and transmitted by the first transmitting mirror 2, and is transmitted to the third transmitting mirror 6 via the second transmitting mirror 5. The third transmitting mirror 6 transmits the light to the fourth transmitting mirror 7. The light is converged by the fourth transmitting mirror 7 to the second detector 9 on the focal plane to form an image on the second detector 9, thus finally realizing optical imaging. The second transmitting mirror 5, the third transmitting mirror 6 and the fourth transmitting mirror 7 are all high-order aspherical transmitting mirrors, such as high-order (four to ten-order) aspherical circular mirrors. The second transmitting mirror 5, the third transmitting mirror 6 and the fourth transmitting mirror 7 all use the high-order aspherical mirrors, which play a good role in correcting the aberration of the optical system.

In the above technical scheme, an aperture of the main reflecting mirror 1 is preferably 426 mm.

In the above technical scheme, the coating film for the first transmitting mirror 2 is an infrared anti-reflection film, which has no special restrictions, as long as the entering light can be split into the visible light spectral segment and the infrared spectral segment. Preferably, the reflectivity of the first transmitting mirror 2 is 98% and the transmittance is 95%.

In the above technical scheme, materials of the main reflecting mirror 1, the third reflecting mirror 3 and the fourth reflecting mirror 4 are preferably silicon carbide (SiC). A material of the first transmitting mirror 2 is preferably germ glass. A material of the second transmitting mirror 5 is preferably zinc selenide (ZnSe) glass. A material of the third transmitting mirror 6 is preferably germ glass. A material of the fourth transmitting mirror 7 is preferably zinc selenide glass.

In the above technical scheme, a cone coefficient of the main reflecting mirror 1 is preferably −0.91. A cone coefficient of the first transmitting mirror 2 is preferably −12.983. A cone coefficient of the third reflecting mirror 3 is preferably −0.149. A cone coefficient of the fourth reflecting mirror 4 is preferably 0.218.

In the above technical scheme, preferably, a radius of curvature of a vertex of a reflecting surface 1-1 of the main reflecting mirror is 714.536 mm; a radius of curvature of a vertex of an entering surface 2-1 (i.e. a reflecting surface) of the first transmitting mirror is 386.402 mm, and a radius of curvature of a vertex of an exiting surface 2-2 of the first transmitting mirror is 177.540 mm; a radius of curvature of a vertex of a reflecting surface 3-1 of the third reflecting mirror is 202.836 mm; a radius of curvature of a vertex of a reflecting surface 4-1 of the fourth reflecting mirror is 264.466 mm; a radius of curvature of a vertex of an entering surface 5-1 of the second transmitting mirror is 101.730 mm, and a radius of curvature of a vertex of an exiting surface 5-2 of the second transmitting mirror is 125.377 mm; a radius of curvature of a vertex of an entering surface 6-1 of the third transmitting mirror is 58.311 mm, and a radius of curvature of a vertex of an exiting surface 6-2 of the third transmitting mirror is 107.076 mm; and a radius of curvature of a vertex of an entering surface 7-1 of the fourth transmitting mirror is 60.574 mm, and a radius of curvature of a vertex of an exiting surface of the fourth transmitting mirror is 37.226 mm.

In the above technical scheme, preferably, a distance between the main reflecting mirror 1 and the first transmitting mirror 2 is 282.906 mm; a distance between the first transmitting mirror 2 and the third reflecting mirror 3 is 285.877 mm; a distance between the third reflecting mirror 3 and the fourth reflecting mirror 4 is 166 mm; a distance between the fourth reflecting mirror 4 and the first detector 8 is 367.228 mm; an air distance between the second transmitting mirror 5 and the first transmitting mirror 2 is 31.79 mm; an air distance between the third transmitting mirror 6 and the second transmitting mirror 5 is 56.23 mm; an air gap between the fourth transmitting mirror 7 and the third transmitting mirror 6 is 14.72 mm; and an the air gap between the second detector 9 and the fourth transmitting mirror 7 is 10 mm.

In the above technical scheme, preferably, a thickness of the first transmitting mirror 2 is 14 mm; a thickness of the second transmitting mirror 5 is 11.7 mm; a thickness of the third transmitting mirror 6 is 10 mm; and a thickness of the fourth transmitting mirror 7 is 11.53 mm.

In the coaxial four-reflection optical system with visible light long-wave infrared common-aperture imaging, the visible light spectral segment has a range of 450 nm to 850 nm; the visible light system has a focal length of 3500 mm; the visible light system has an F-number of 8.33; the visible light system has a range of a total field of view of 1.6°; the visible light system has a transmittance greater than or equal to 0.8; and the visible light system has distortion less than 0.75% and a veiling glare coefficient less than or equal to 3%. The infrared spectral segment has a range of 8000 nm to 12000 nm; the infrared system has a focal length of 706 mm; the infrared system has an F-number of 1.68; the infrared system has a range of a total field of view of 1.2°; the infrared system has a transmittance greater than or equal to 0.75; and the infrared system has distortion less than 0.5%.

A size of an outer envelope of the coaxial four-reflection optical system with visible light long-wave infrared common-aperture imaging has is Φ426×760 mm, and a size of an outer envelope of the visible light system in the coaxial four-reflection optical system with visible light long-wave infrared common-aperture imaging is Φ426×590 mm.

The terms used in the present disclosure generally have the meaning commonly understood by those of ordinary skill in the art unless otherwise stated.

In order to enable those skilled in the art to better understand the technical schemes of the present disclosure, the present disclosure will be further described in detail in combination with embodiments.

In the following embodiments, various processes and methods not described in detail are common methods in the art. The materials, reagents, devices, instruments, equipment, etc. used in the following embodiments can be obtained commercially without special instructions.

Embodiment 1

A coaxial four-reflection optical system with visible light long-wave infrared common-aperture imaging includes a main reflecting mirror 1, a first transmitting mirror 2, a third reflecting mirror 3, a fourth reflecting mirror 4, a second transmitting mirror 5, a third transmitting mirror 6 and a fourth transmitting mirror 7. The main reflecting mirror 1, the first transmitting mirror 2, the third reflecting mirror 3 and the fourth reflecting mirror 4 are coaxial and are all two-order aspherical mirrors. The main reflecting mirror 1 is used as an aperture diaphragm of the coaxial four-reflection optical system with visible light long-wave infrared common-aperture imaging. A material of the first transmitting mirror 2 is germ glass, a surface of which is coated with a film. The third reflecting mirror 3 and the main reflecting mirror 1 are integrated. The third reflecting mirror 3 and the fourth reflecting mirror 4 are both provided with light passing holes. The second transmitting mirror 5, the third transmitting mirror 6 and the fourth reflecting mirror 7 are all high-order aspherical transmitting mirrors. The first transmitting mirror 2, the fourth reflecting mirror 4, the second transmitting mirror 5, the third transmitting mirror 6 and the fourth transmitting mirror 7 are located on the same side of the main reflecting mirror 1. A distance between the main reflecting mirror 1 and the first transmitting mirror 2 is 282.906 mm; a distance between the first transmitting mirror 2 and the third reflecting mirror 3 is 285.877 mm; a distance between the third reflecting mirror 3 and the fourth reflecting mirror 4 is 166 mm; a distance between the fourth reflecting mirror 4 and the first detector 8 is 367.228 mm; an air distance between the second transmitting mirror 5 and the first transmitting mirror 2 is 31.79 mm; an air distance between the third transmitting mirror 6 and the second transmitting mirror 5 is 56.23 mm; an air gap between the fourth transmitting mirror 7 and the third transmitting mirror 6 is 14.72 mm; and an the air gap between the second detector 9 and the fourth transmitting mirror 7 is 10 mm. A thickness of the first transmitting mirror 2 is 14 mm; a thickness of the second transmitting mirror 5 is 11.7 mm; a thickness of the third transmitting mirror 6 is 10 mm; and a thickness of the fourth transmitting mirror 7 is 11.53 mm. The specific parameters of the various optical elements are shown in Table 1.

The entering light is split into the visible light spectral segment and the infrared spectral segment by the first transmitting mirror 2 after being reflected by the main reflecting mirror 1. The visible light spectral segment reaches the third reflecting mirror 3 through the light passing hole on the fourth reflecting mirror 4 after being reflected by the first transmitting mirror 2. The third reflecting mirror 3 then reflects the light to the fourth reflecting mirror 4. The reflected light is converged to the first detector 8 located at a focal plane after passing through the light passing hole on the third reflecting mirror 3 to form an image on the first detector 8. The infrared spectral segment partially reaches the second transmitting mirror 5 after being transmitted by the first transmitting mirror 2. The transmitted light reaches the third reflecting mirror 6 through the second transmitting mirror 5. The third transmitting mirror 6 then transmits the light to the fourth transmitting mirror 7. The transmitted light is converged to the second detector 9 located at the focal plane after being transmitted by the fourth transmitting mirror 7 to form an image on the second detector 9.

TABLE 1

Parameters of the various optical elements of the coaxial four-reflection optical system with visible light long-wave infrared common-aperture imaging of Embodiment 1

| Name | Surface | Radius of curvature of surface/mm | Thickness/distance/mm | Cone coefficient | Aperture D/mm |
|---|---|---|---|---|---|
| Main reflecting mirror | 1-1 | −714.536 | −282.906 | −0.91 | 426 |
| First transmitting mirror | 2-1 | −386.402 | 285.877 | −12.983 | — |
| Third reflecting mirror | 3-1 | −202.836 | −166 | −0.149 | — |
| Fourth reflecting mirror | 4-1 | −264.466 | 367.228 | 0.218 | — |
| — | — | — | — | Material | — |
| First transmitting mirror | 2-1 | 386.402 | 14 | Germ | — |
|  | 2-2 | 177.540 | 31.79 |  | — |
| Second transmitting mirror | 5-1 | 101.730 | 11.70 | ZnSe | — |
|  | 5-2 | 125.377 | 56.23 |  | — |
| Third transmitting mirror | 6-1 | −58.311 | 10 | Germ | — |
|  | 6-2 | −107.076 | 14.72 |  | — |
| Fourth transmitting mirror | 7-1 | −60.574 | 11.53 | ZnSe | — |
|  | 7-2 | −37.226 | 10 |  | — |

The optical parameters of the coaxial four-reflection optical system with visible light long-wave infrared common-aperture imaging of Embodiment 1 are analyzed, and results are as shown in Table 2.

TABLE 2

Optical parameters of the coaxial four-reflection optical system with visible light long-wave infrared common-aperture imaging of Embodiment 1

| Visible light system | | Infrared system | |
|---|---|---|---|
| Item | Indicator | Item | Indicator |
| Spectral segment range/nm | 450-850 | Spectral segment range/nm | 8000-12000 |
| Focal length/mm | 3500 | Focal length/mm | 706 |
| Aperture/mm | Φ426 | F/# | 1.68 |
| F/# | 8.33 | Full field of view/° | 1.2 |
| Full field of view/° | 1.6 | Transmittance of the optical system | ≥0.75 |
| Transmittance of the optical system | ≥0.80 | Distortion of the optical system | ≤0.5% |
| Distortion of the optical system | ≤0.75% | — | — |

TABLE 2-continued

Optical parameters of the coaxial four-reflection optical system with visible light long-wave infrared common-aperture imaging of Embodiment 1

| Visible light system | | Infrared system | |
|---|---|---|---|
| Item | Indicator | Item | Indicator |
| Stray light coefficient | ≤0.3% | — | — |
| Size of the outer envelope | Φ426 × 590 | — | — |
| Total length/mm | 590 | — | — |

The size of the outer envelope of the coaxial four-reflection optical system with visible light long-wave infrared common-aperture imaging is Φ426 × 760.

Figure 2:
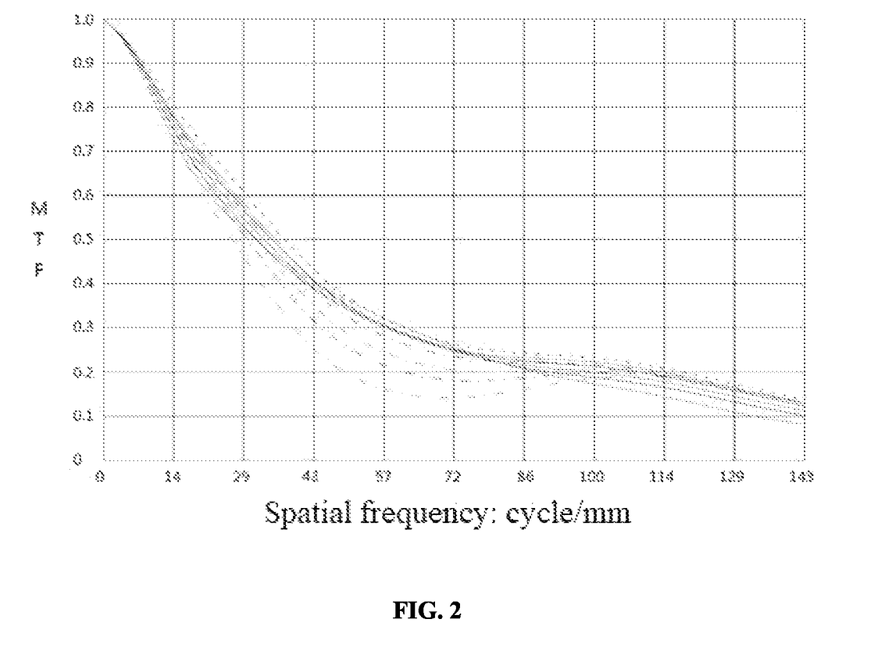
FIG. 2 is a curve of an optical transfer function of a visible light system in the coaxial four-reflection optical system with visible light long-wave infrared common-aperture imaging of Embodiment 1 of the present disclosure.
Figure 3:
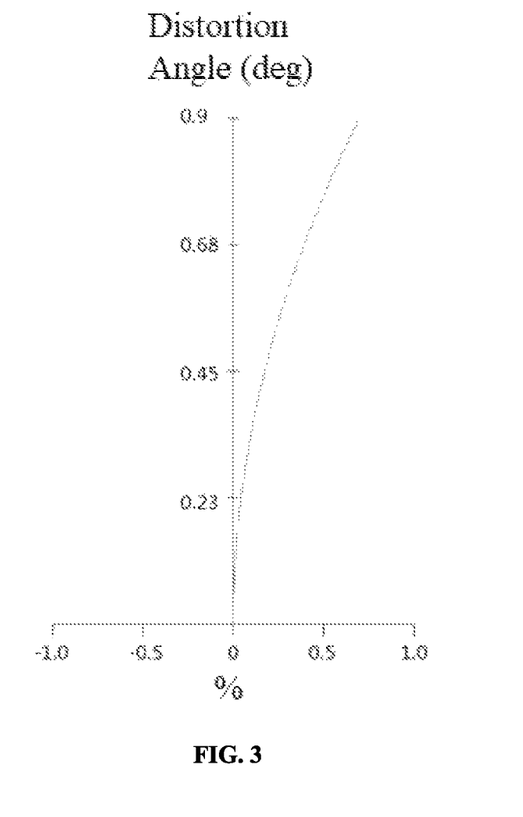
FIG. 3 is a curve of distortion of a visible light system in the coaxial four-reflection optical system with visible light long-wave infrared common-aperture imaging of Embodiment 1 of the present disclosure.

The visible light system of the coaxial four-reflection optical system with visible light long-wave infrared common-aperture imaging of Embodiment 1 is analyzed, and results are as shown in FIG. 2 and FIG. 3. FIG. 2 and FIG. 3 respectively show a curve of an optical transfer function and a curve of distortion of the visible light system. In FIG. 2, the abscissa is a spatial frequency in cycle/mm, and the ordinate is a modulus of the optical transfer function (MTF). FIG. 3 is the curve of the distortion. It can be seen from FIG. 2 and FIG. 3 that an average transfer function of the full field of view is 0.12@Nyquist. The distortion of the full field of view is less than 0.75%, indicating that the optical system of the present disclosure has good imaging quality.

Figure 4:
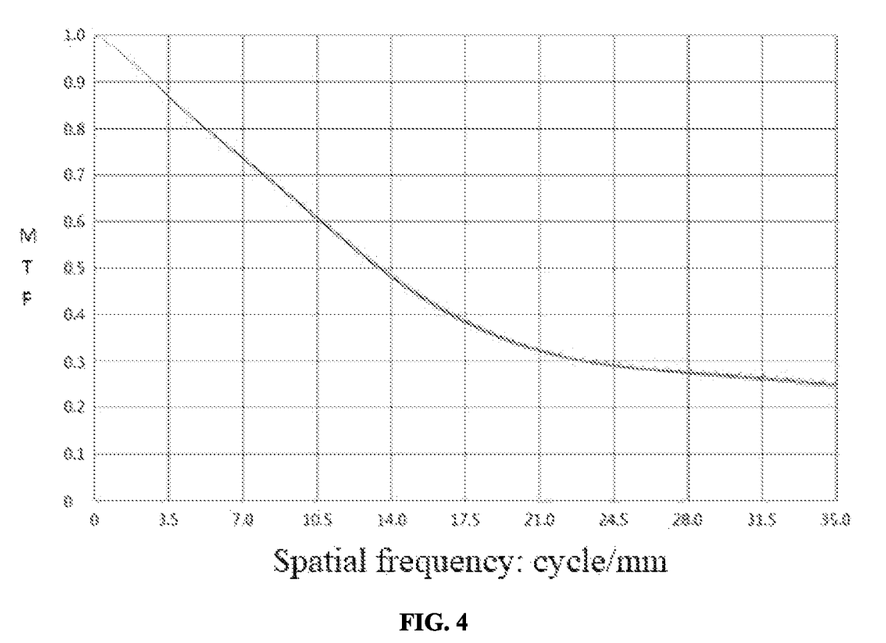
FIG. 4 is a curve of an optical transfer function of an infrared system in the coaxial four-reflection optical system with visible light long-wave infrared common-aperture imaging of Embodiment 1 of the present disclosure.
Figure 5:
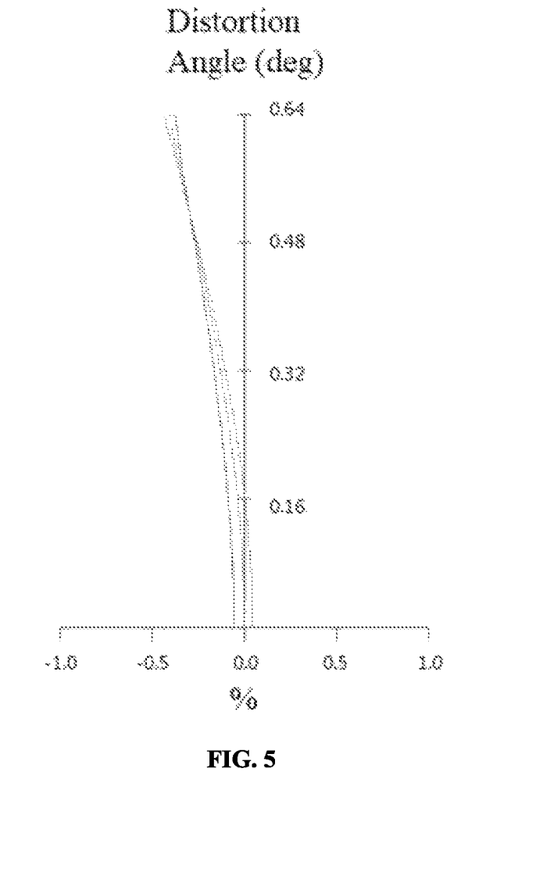
FIG. 5 is a curve of distortion of an infrared system in the coaxial four-reflection optical system with visible light long-wave infrared common-aperture imaging of Embodiment 1 of the present disclosure.

The infrared system of the coaxial four-reflection optical system with visible light long-wave infrared common-aperture imaging of Embodiment 1 is analyzed, and results are as shown in FIG. 4 and FIG. 5. FIG. 4 and FIG. 5 respectively show a curve of an optical transfer function and a curve of distortion of the infrared system. In FIG. 4, the abscissa is a spatial frequency in cycle/mm, and the ordinate is a modulus of the optical transfer function (MTF). FIG. 5 is the curve of the distortion. It can be seen from FIG. 4 and FIG. 5 that an average transfer function of the full field of view is 0.25@Nyquist. The distortion of the full field of view is less than or equal to 0.5%, indicating that the optical system of the present disclosure has good imaging quality.

To sum up, it can be explained that the coaxial four-reflection optical system with visible light long-wave infrared common-aperture imaging has a compact structure, and the size of the outer envelope is Φ426×760, which can meet the application requirements for light and small space cameras. It can be seen that the focal length of the visible light system can reach 3500 mm, and the size of the outer envelope is Φ426×590, with the characteristics of long focal length and small F number. It can be seen that the average transfer function of the full field of view of the visible light system is 0.12@Nyquist. The distortion of the full field of view is less than 0.75%. A simulation result of the veiling glare coefficient is 3%. The whole visible light system has good stray light suppression performance. The focal length of the infrared system can reach 706 mm, and the average transfer function of the full field of view of the infrared system is 0.25@Nyquist. The distortion of the full field of view is less than or equal to 0.5%. The whole infrared system has good imaging quality.

The technical features of the embodiments described above can be arbitrarily combined. In order to make the description concise, all possible combinations of various technical features in the above embodiments are not completely described. However, the combinations of these technical features should be considered as the scope described in the present specification as long as there is no contradiction in them.

The foregoing embodiments represent only a few implementation modes of the disclosure, and the descriptions are specific and detailed, but should not be construed as limiting the patent scope of the disclosure. It should be noted that those of ordinary skill in the art can further make various transformations and improvements without departing from the concept of the present disclosure, and these transformations and improvements all fall within the protection scope of the present disclosure. Therefore, the protection scope of the patent of the present disclosure shall be subject to the appended claims.

What is claimed is:

1. A coaxial four-reflection optical system with visible light long-wave infrared common-aperture imaging, comprising a main reflecting mirror, a first transmitting mirror, a third reflecting mirror, a fourth reflecting mirror, a second transmitting mirror, a third transmitting mirror and a fourth transmitting mirror, wherein the main reflecting mirror, the first transmitting mirror, the third reflecting mirror and the fourth reflecting mirror are coaxially disposed and are all two-order aspherical mirrors; the main reflecting mirror is used as an aperture diaphragm of the coaxial four-reflection optical system with visible light long-wave infrared common-aperture imaging; a surface of the first transmitting mirror is coated with a film to split entering light into a visible light spectral segment and an infrared spectral segment; the third reflecting mirror and the main reflecting mirror are integrated, and light passing holes are formed in both the third reflecting mirror and the fourth reflecting mirror; the second transmitting mirror, the third transmitting mirror and the fourth transmitting mirror are all high-order aspherical transmitting mirrors; the first transmitting mirror, the fourth reflecting mirror, the second transmitting mirror, the third transmitting mirror and the fourth transmitting mirror are located on the same side of the main reflecting mirror;

the entering light is split into the visible light spectral segment and the infrared spectral segment by the first transmitting mirror after being reflected by the main reflecting mirror; the visible light spectral segment reaches the third reflecting mirror through the light passing hole on the fourth reflecting mirror after being reflected by the first transmitting mirror; the third reflecting mirror then reflects the light to the fourth reflecting mirror; the reflected light is converged to a first detector located at a focal plane after passing through the light passing hole on the third reflecting mirror to form an image on the first detector; the infrared spectral segment partially reaches the second transmitting mirror (5) after being transmitted by the first transmitting mirror; the transmitted light reaches the third reflecting mirror through the second transmitting mirror; the third transmitting mirror then transmits the light to the fourth transmitting mirror; the transmitted light is converged to a second detector located at the focal plane after being transmitted by the fourth transmitting mirror to form an image on the second detector;

a radius of curvature of a vertex of a reflecting surface of the main reflecting mirror is 714.536 mm; a radius of curvature of a vertex of an entering surface of the first transmitting mirror is 386.402 mm, and a radius of curvature of a vertex of an exiting surface of the first transmitting mirror is 177.540 mm; a radius of curvature of a vertex of a reflecting surface of the third reflecting mirror is 202.836 mm; a radius of curvature of a vertex of a reflecting surface of the fourth reflecting mirror is 264.466 mm; a radius of curvature of a vertex of an entering surface of the second transmitting mirror is 101.730 mm, and a radius of curvature of a vertex of an exiting surface of the second transmitting mirror is 125.377 mm; a radius of curvature of a vertex of an entering surface of the third transmitting mirror is 58.311 mm, and a radius of curvature of a vertex of an exiting surface of the third transmitting mirror is 107.076 mm; and a radius of curvature of a vertex of an entering surface of the fourth transmitting mirror is 60.574 mm, and a radius of curvature of a vertex of an exiting surface of the fourth transmitting mirror is 37.226 mm.

2. The coaxial four-reflection optical system with visible light long-wave infrared common-aperture imaging according to claim 1, wherein an aperture of the main reflecting mirror is 426 mm; a material of the first transmitting mirror is germ glass; the coating film is an infrared anti-reflection film; and the first transmitting mirror has a reflectivity of 98% and a transmittance of 95%.

3. The coaxial four-reflection optical system with visible light long-wave infrared common-aperture imaging according to claim 1, wherein the visible light spectral segment of the coaxial four-reflection optical system with visible light long-wave infrared common-aperture imaging has a range of 450 nm to 850 nm, and the infrared spectral segment of the coaxial four-reflection optical system with visible light long-wave infrared common-aperture imaging has a range of 8000 nm to 12000 nm.

4. The coaxial four-reflection optical system with visible light long-wave infrared common-aperture imaging according to claim 1, wherein a visible light system in the coaxial four-reflection optical system with visible light long-wave infrared common-aperture imaging has a focal length of 3500 mm, and an infrared system in the coaxial four-reflection optical system with visible light long-wave infrared common-aperture imaging has a focal length of 706 mm.

5. The coaxial four-reflection optical system with visible light long-wave infrared common-aperture imaging according to claim 1, wherein the visible light system in the coaxial four-reflection optical system with visible light long-wave infrared common-aperture imaging has an F-number of 8.33, and the infrared system in the coaxial four-reflection optical system with visible light long-wave infrared common-aperture imaging has an F-number of 1.68.

6. The coaxial four-reflection optical system with visible light long-wave infrared common-aperture imaging according to claim 1, wherein the visible light system in the coaxial four-reflection optical system with visible light long-wave infrared common-aperture imaging has a range of a total field of view of 1.6°, and the infrared system in the coaxial four-reflection optical system with visible light long-wave infrared common-aperture imaging has a range of a total field of view of 1.2°.

7. The coaxial four-reflection optical system with visible light long-wave infrared common-aperture imaging according to claim 1, wherein the visible light system in the coaxial four-reflection optical system with visible light long-wave infrared common-aperture imaging has a transmittance greater than or equal to 0.8, and the infrared system in the coaxial four-reflection optical system with visible light long-wave infrared common-aperture imaging has a transmittance greater than or equal to 0.75.

8. The coaxial four-reflection optical system with visible light long-wave infrared common-aperture imaging according to claim 1, wherein the visible light system in the coaxial four-reflection optical system with visible light long-wave infrared common-aperture imaging has distortion less than 0.75% and a veiling glare coefficient less than or equal to 3%, and the infrared system in the coaxial four-reflection optical system with visible light long-wave infrared common-aperture imaging has distortion less than 0.5%.

9. The coaxial four-reflection optical system with visible light long-wave infrared common-aperture imaging according to claim 1, wherein a size of an outer envelope of the coaxial four-reflection optical system with visible light long-wave infrared common-aperture imaging has is Φ426× 760 mm, and a size of an outer envelope of the visible light system in the coaxial four-reflection optical system with visible light long-wave infrared common-aperture imaging is Φ426×590 mm.

* * * * *